US005552944A

United States Patent [19]
Clemow

[11] Patent Number: 5,552,944
[45] Date of Patent: Sep. 3, 1996

[54] METHOD AND APPARATUS FOR THE DETERMINATION OF AZIMUTH ERROR

[75] Inventor: Richard D. Clemow, Gerrards Cross, England

[73] Assignee: Central Research Laboratories Limited, Hayes, England

[21] Appl. No.: 387,779

[22] PCT Filed: May 23, 1994

[86] PCT No.: PCT/GB94/01119

§ 371 Date: Feb. 21, 1995

§ 102(e) Date: Feb. 21, 1995

[87] PCT Pub. No.: WO95/00952

PCT Pub. Date: Jan. 5, 1995

[30] Foreign Application Priority Data

Jun. 22, 1993 [GB] United Kingdom .................. 9312831

[51] Int. Cl.⁶ .............................. G11B 20/20; G11B 5/56
[52] U.S. Cl. .................. 360/76; 360/77.12; 324/207.25
[58] Field of Search .................................. 360/24, 25, 26, 360/31, 76, 77.12, 53; 324/206, 207.25, 172, 173, 178, 179; 364/604

[56] References Cited

U.S. PATENT DOCUMENTS

| 3,678,220 | 7/1972 | Luhr . | |
|---|---|---|---|
| 4,101,937 | 7/1978 | Jenkins | 360/76 |
| 4,317,144 | 2/1982 | De Niet et al. | 360/76 |
| 4,468,752 | 8/1994 | Chatham | 360/51 |
| 4,472,747 | 9/1984 | Schwartz | 360/32 |
| 4,506,309 | 3/1985 | Joannou et al. | 360/77.12 X |
| 4,686,470 | 8/1987 | Bond | 360/76 X |
| 5,309,299 | 5/1994 | Crossland et al. | 360/77.12 X |

FOREIGN PATENT DOCUMENTS

| 1395717 | 3/1965 | France . | |
|---|---|---|---|
| 51-146814 | 12/1976 | Japan . | |
| 56-77925 | 6/1981 | Japan . | |
| 56-77787 | 11/1982 | Japan | 360/76 |
| 61-085617 | 5/1986 | Japan . | |
| 62-226401 | 10/1987 | Japan . | |
| 62-262206 | 11/1987 | Japan . | |
| 01-38607 | 8/1990 | Japan . | |

OTHER PUBLICATIONS

Donnelly, T., et al., "Real–time Microprocessor Monitoring of Skew Angle in a Compact Cassette Multitrack Magnetic Tape System", *Journal of the Institution of Electronic and Radio Engineers*, vol. 56, No. 2, pp. 49–52, Feb. 1986.

Taryshkin, A. G., "Measurement and Correction of Interchannel Phase–Frequency Response of a Magnetograph", 2353 *Measurement Techniques* 27, No. 3, pp. 257–260, Mar. 1984.

Rosback, Thomas J., "A Digital Audio Time–Base Corrector for Linear Magnetic Recording", *SMPTE Journal*, pp. 1180–1184, Nov. 1985.

*Primary Examiner*—Aristotelis Psitos
*Assistant Examiner*—Larry Cullen
*Attorney, Agent, or Firm*—Keck, Mahin & Cate

[57] ABSTRACT

Azimuth error between a write head (16) and a read head (34) is determined by passing a multi-track tape (2) past the write head (16) and subsequently the read head (34). The signals written by the write head (16) and read by the read head (34) are analysed to determine the timing error (38) between best-match time-delayed portions (20–28) of these signals. This timing error (38) is indicative of the azimuth error.

17 Claims, 3 Drawing Sheets

METHOD AND APPARATUS FOR THE DETERMINATION OF AZIMUTH ERROR

The present invention relates to the determination of azimuth error between determination as may be utilised in audio cassette recording and playback.

It is known that azimuth accuracy is a fundamental feature of good audio cassette duplication. By azimuth is meant the angle between the gap of the read head relative to the direction of movement of the tape and also the gap of the write head relative to the direction of movement of the tape. The write head having supplied information to the tape. If these two angles are both zero, the azimuths are zero and optimum high-frequency performance may be achieved. Should either azimuth deviate from zero, then deterioration in this high-frequency range may result.

Conventionally azimuth accuracy is achieved by maintaining the write head gap, during recording, at exactly 90° to the direction of tape movement and also maintaining the read head at the same angle during playback. U.S. Pat. No. 4,709,288 discloses such a mechanism. A fine adjustment mechanism, such as a micrometer screw is provided by which either the cassette tape guide elements or the write or read head itself may be partially rotated or pivoted in order to maintain the head normal to the direction of the tape travel.

The above system, whilst adequate, suffers from the shortcomings that in order for accurate micrometer calibration to be achieved, a test tape must be used. This tape bears a recording of a sine wave at a frequency towards the upper end of the bandwidth over which the machine is to operate. The micrometer screw is then adjusted until the maximum signal output level is achieved.

It will be appreciated that to use such a test tape prior to each playback is, at best, a nuisance in, for example, mass reproduction situations.

It is, therefore, an attractive proposition to have a system for the measurement of azimuth error which does not necessarily require the use of a test tape. Furthermore it is an object of the present invention to provide a method of measurement of the azimuth error by utilising the signals actually recorded on the tape—rather than necessarily using a dedicated test tape.

Thus according to a first aspect of the present invention there is provided a method for the determination of azimuth error between write and read heads moving relative to first and further signals borne by a carder comprising:

analysing the first and further signals as supplied by the write head and analysing the same signals as received by the read head, wherein analysing of the write head and read head signals includes temporally delaying the first signals with respect to the further signals, passing the further signals through a plurality of time delays thereby to provide a plurality of time-delayed further signals each having a different associated time delay, and providing time-delay values corresponding to the best correlation between the time-delayed first signals and each of the plurality of time-delayed further signals;

subtracting the time-delay value of the best-correlation read head signal from the time-delay value of the best-correlation write head signal to provide a timing error value from which the azimuth error may be derived.

Thus the invention provides the advantage that a dedicated test tape is no longer necessary as the signals recorded on the carder by the write head may themselves be analysed—as read by the read head—in order to provide a timing error which directly relates to the azimuth error. Use of a test tape is, however, not precluded.

Preferably the write and read heads move at speed, v, relative to the carrier, and the first and further signals are spaced apart on the carder by distance, d; and wherein the azimuth error is derived by multiplying the timing error by v/d.

Additionally the time delays may be cascaded, or in parallel.

According to a second aspect of the present invention there is provided apparatus for determination or azimuth error between write and read heads moving relative to first and further signals borne by a carder, including;

first time-delay means for delaying the first signals with respect to the further signals, both first and further signals supplied by both the write head and the read head;

further time-delaying means for delaying the further signals from the write and read heads respectively to provide a plurality of time-delayed further signals each having a different associated time delay;

correlation means for providing time-delay values corresponding to the best correlation between the time-delayed first signals and each of the plurality of time-delayed further signals from both the write head and read head;

and means for subtracting the time-delay value of the best-correlated read head signal from the time-delay value of the best-correlated write head signal to provide a timing error value from which the azimuth error may be derived.

The invention will now be described, by way of example only and with reference to the accompanying drawings of which:

Figure 1:
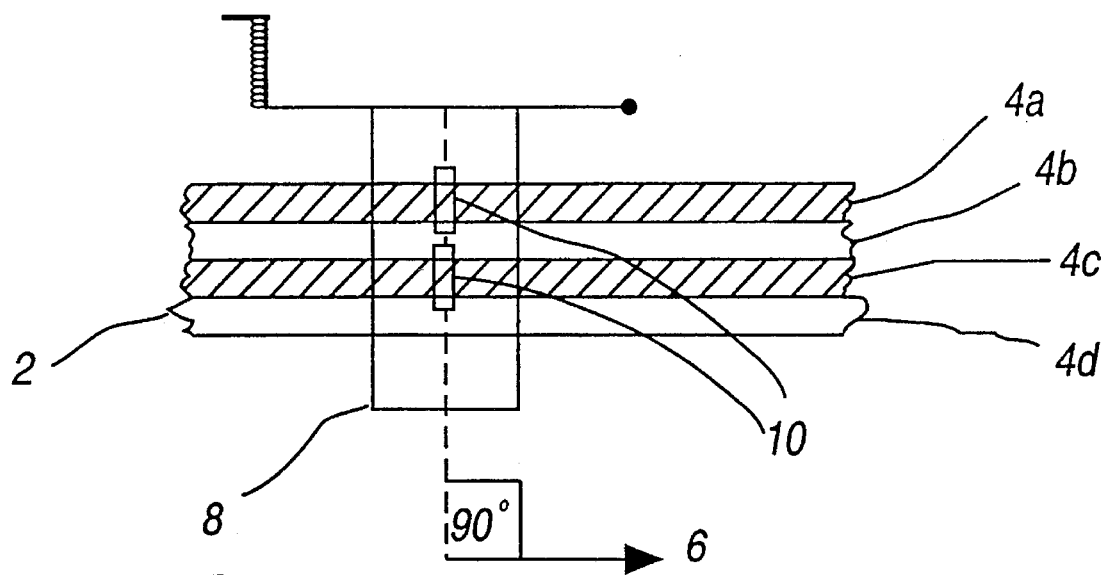
FIGS. 1 and 2 illustrate schematically a known form of azimuth error determination.

Referring firstly to FIG. 1 it can be seen that with the known azimuth apparatus, a carder, shown as tape 2, bears two tracks, 4a and 4c and two gaps 4b and 4d adjacent each track. The tracks 4a and 4c bear magnetically encoded information. This encoding is well known and so will not be discussed herein. The tape 2 moves in the direction shown by arrow 6.

A magnetic read head 8 is placed over and adjacent the tape 2 and two gaps 10 in the read head 8 are arranged to lie at 90° to the direction 6, and above each track 4a, 4c.

Figure 2:
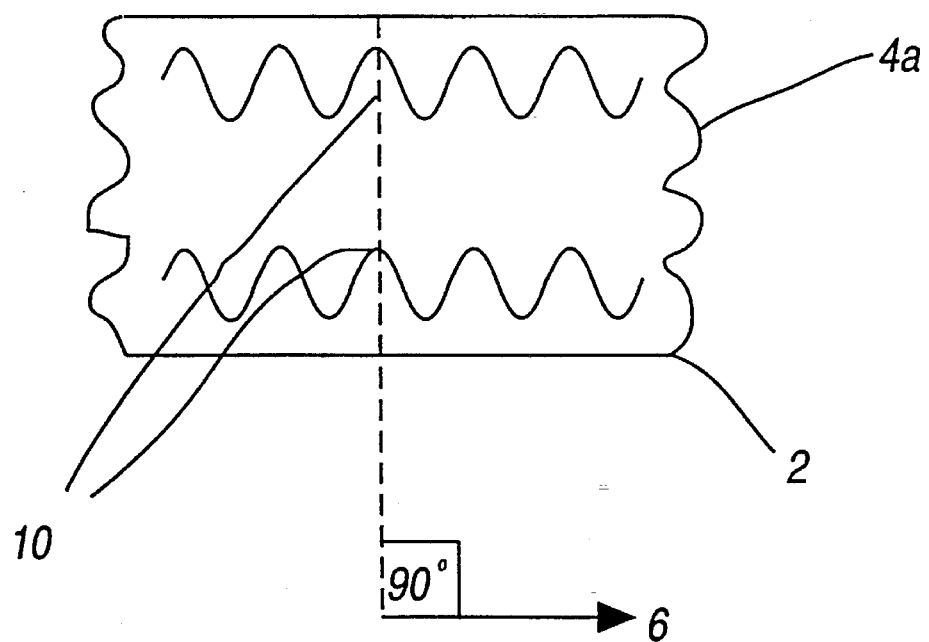

Referring now also to FIG. 2, this adjustment is more fully described. As can be seen, the track 4a bears two sine waves. Although not shown, track 4c also bears two sine waves. The sine waves are such that as the tape moves in direction 6, if, and only if, the gap 10 is normal to the direction, then the sine waves will be in phase as seen along the length of the gap. It is apparent therefore, that any deviations away from this normal will result in a phase difference between the sine waves as viewed by the gap 10 and hence a reduction in the output level of signals from the read head In practice, it may be the tape 2 itself rather than the read head 8 which will become misaligned, but in any event this will result in the angle between the gap 10 and the direction 6 being slightly deviated from 90°. For a standard compact cassette tape an error of only 0.2° (or 12 minutes of arc) will give a high-frequency loss of 3 dB at 10 kHz; this represents a physical misalignment of about 3 mm over a tape path length of 1 m. An error of around 30 minutes of arc will result in complete cancellation of the signals at around 10 kHz.

Figure 3:
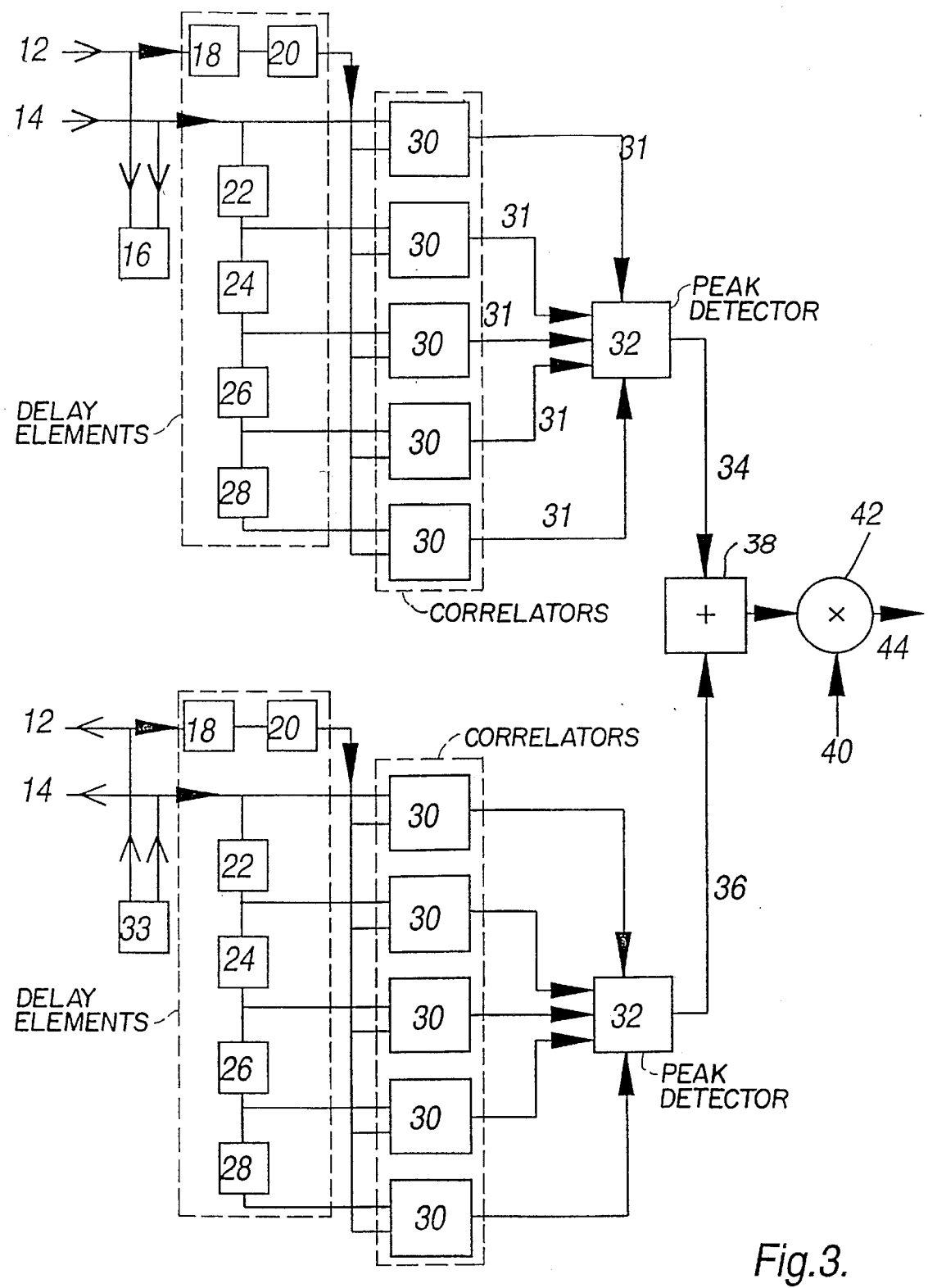
FIG. 3 illustrates schematically an embodiment of the present invention.

Referring now to FIG. 3, it will be seen that the present invention utilises any signals recorded on at least two tracks. This is because, as between the writing and reading operations, any non-zero azimuth will be manifest as a timing error between the tracks.

First signal 12 and further signal 14 are supplied to write head 16 (of similar construction to that of head 8 as illustrated in FIG. 1). The signal 12 is for the left channel of a stereo recording and the signal 14 for the fight channel. Part of the signal 12 is tapped off and fed into a fast time-delay means, in this example two cascaded delay elements 18,20. Similarly part of the signal 14 is tapped off and fed into a further time-delay means, here four cascaded delay elements 22,24,26 and 28.

Each of the delay elements 18–28 is chosen to introduce a delay of T into the signal passing therethrough. Hence the fast signal 12 is delayed by 2T.

The first signal 12, having been delayed by 2T is then split into five identical portions and each portion is input into one of five correlators 30. Also input to each of the correlators 30 is each of the further signals 14 from the node points formed by the cascaded delay elements 22,24,26 and 28.

Hence to each of the correlators 30 is input two signals—a first signal 12 of the time delay 2T and a time delayed further signal 14 having one of the delays—O, T, 2T, 3T, 4T.

The output from each correlator 30 is a time-delay value 31 which represents the difference between the two inputs it receives, and this output is then input to a peak position detector 32 which determines which time delay 22–28 provides the best correlation result with the time-delayed first signal 12. This may, in the simplest form, be done by the detector 32 simply selecting a time-delay value 31 corresponding to one of its five inputs which provides the largest value; alternatively the detector 32 may fit a curve to its five input time-delay values 3 1and locate the position on the curve of the correlation peak by interpolation, thereby to ascertain a value anywhere in the range −2T to +2T. The range −2T to +2T will be understood to be derived from the difference between the delay of first signal 12 of 2T and any one of the delays of the delays of the further signal 14 of 0–4T.

It will be apparent that if the first signal 12 and the further signal 14 are the same, then the position of the correlation peak will be zero. However, as signal 12 is the left track of a stereo signal and signal 14 the right track, then, for conventional stereo signals, the peak will shift away from zero dependent upon the programme content. If the programme is biassed toward the left, then the right track 14 will tend to be delayed relative to the left track 12 and this will be reflected in the position of the correlation peak. Conversely, if the programme is biassed towards the right, the correlation peak will tend to shift in the other direction.

Thus on its own, the position of the correlation peak is not particularly useful. However, by analysing also the same parameter for the signals received by the read head and subtracting this from the signals supplied to the write head 16, then the effect of the programme content may be cancelled out.

Referring still to FIG. 3, the read head 33 reads off the first and further signals 12 and 14 subsequent to their being recorded by the write head 16, and exactly the same procedure is carded out as has been described above, hence in the lower half of FIG. 3 like components are similarly numbered.

The output 34 of peak detector 32 associated with the write head 16 and the output 36 of peak detector 32 associated with the read head is then passed to a means for subtracting output 36 from output 34. In the present example the means for subtracting is subtractor 38.

The output of the subtractor 38 will thus be a timing error associated with the write head 16 and the read head 33, from which the azimuth error may be readily derived.

This derivation relies on the relationship between the speed of the tape 2 and the distance between the tracks 4a and 4c (FIG. 1). Assuming that the tape speed is v and the distance between the two tracks is d, then the azimuth error, e, is radians is given by:

$$e = \frac{vt}{d} \quad \text{where } t \text{ is the timing error 38.}$$

d and v are either known or may be found simply. For example, a look-up table may store feasible combinations or sensors on or adjacent the tape may determine v and d as the tape moves.

In any event, the constant v/d, 40 may be multiplied with the timing error signal 38 in multiplier 42 to provide the azimuth error, e, at 44.

It will be appreciated that as the present invention utilises a timing relationship between the signals under consideration, then at least two such signals (in the above example the two tracks 4a and 4c) are needed. Using more is, of course, optional. Furthermore there must be some degree of correlation between the signals under test as supplied to the write head and before recording. In the above example, this criterion has been met by using the left and fight channels of a stereo signal. This requirement will be readily apparent because without a degree of correlation in the original signals, then timing errors would be meaningless.

Since the present invention enables determination of the azimuth error between the write head and the read head, then the azimuth errors of one of these heads must already be known. Conveniently it is the read head whose azimuth error is known as this, as has been discussed above, may readily be set to zero using conventional methods.

It will be understood that the write and read operations may be achieved as part of one operation or may be two totally separate operations. However, it is necessary that the record and playback signals, that in those signals 12, 14 associated with the write head and read head respectively, are approximately synchronised so that the correlators 30 operate on approximately the same sections of these record and playback signals.

In the foregoing it will be understood that by correlation means is meant both the correlation 30 and their associated peak detector element 32. This is so because both the correlators 30 and the peak detector elements 32 are necessary to provide the maximum-value signal result.

Figure 4:
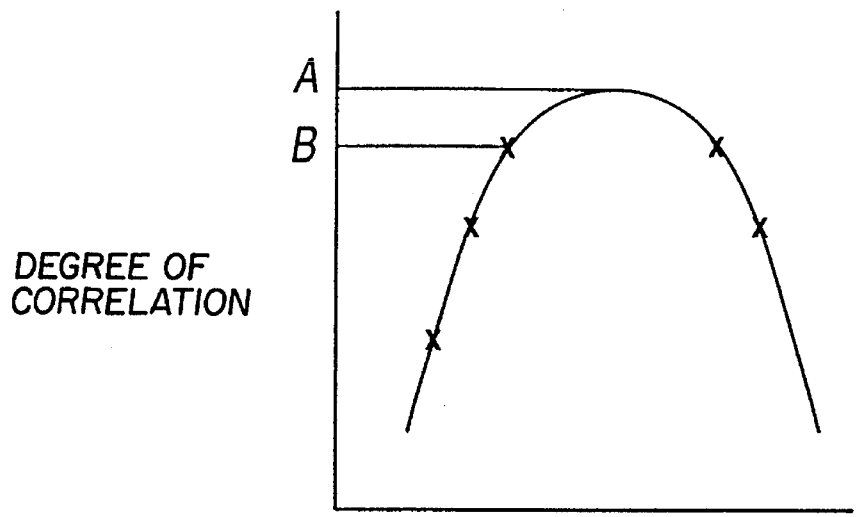
FIG. 4 illustrates graphically how signals are interpolated.

Referring to FIG. 4 illustrates graphically how the correlation means is able to fit a curve to the data supplied thereto and locate the position of the correlation peak by interpolation. A indicates the maximum supplied value and yet B indicates the actual maximum value obtained by interpolation.

Figure 5:
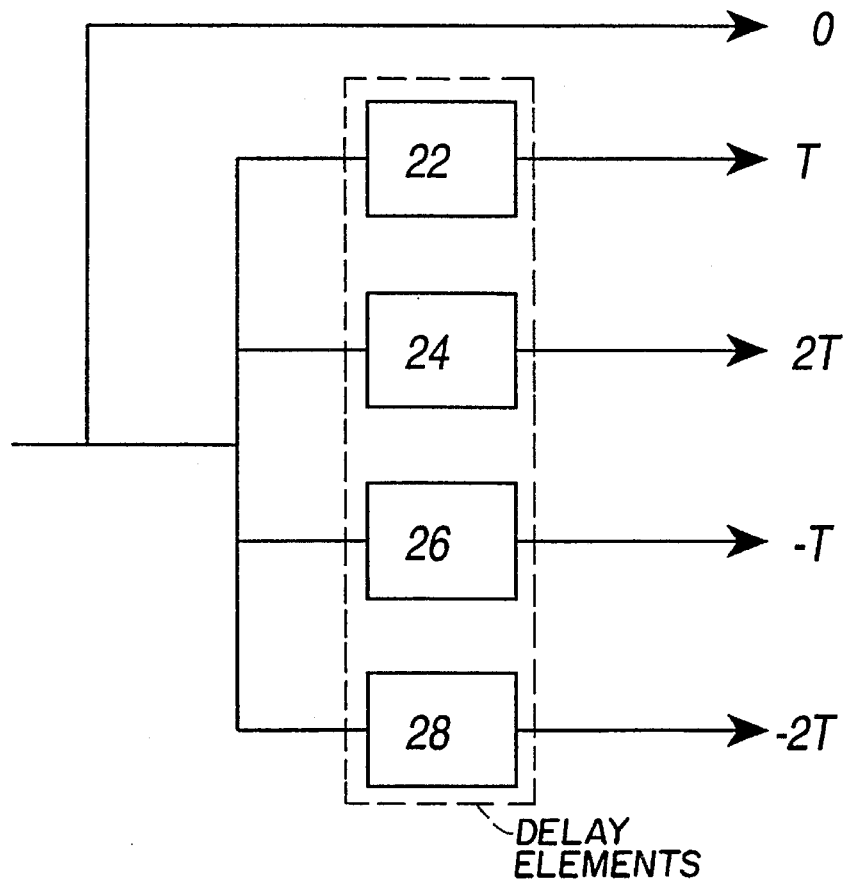
FIG. 5 illustrates an alternative format for the time delays.

FIG. 5 illustrates schematically a parallel arrangement for the time delays 22,24,26 and 28.

It will be apparent that the present invention is not limited in its application to audio azimuth error determination. Indeed any suitable signals may be applied to any suitable carder.

claim:

1. A method for determining an azimuth error between a write head and a read head moving relative to first and further signals borne by a carrier comprising the steps of:

analysing the first and further signals as supplied by the write head including temporally delaying the first signal with respect to the further signal, passing the further signal through a plurality of time delays to thereby provide a plurality of time-delayed further signals each having a different associated time delay, and providing a time-delay value corresponding to the best correlation between the write time-delayed first signal and each of the plurality of time-delayed further signals;

analysing the first and further signals as supplied by the read head including temporally delaying the first signal with respect to the further signal, passing the further signal through a plurality of time delays to thereby provide a plurality of time-delayed further signals each having a different associated time delay and providing a time delay value corresponding to the best correlation between the read time-delayed first signal and each of the plurality of time-delayed further signals; and subtracting the time-delayed value of a best correlation read head signal from the time-delay value of a best correlation write head signal to provide a timing error value from which the azimuth error may be derived.

2. A method according to claim 1 and further comprising the steps of moving the write and read heads at speed, v, relative to the carrier, spacing the first and further signals apart on the carrier by distance, d and deriving the azimuth error by multiplying the timing error by v/d.

3. A method according to claim 1 and further comprising the step of cascading the time delays.

4. A method according to claim 2 and further comprising the step of cascading the time delays.

5. A method according to claim 1 and further comprising the step of providing the time delays in parallel.

6. A method according to claim 2 and further comprising the step of providing the time delays in parallel.

7. An apparatus for determination of azimuth error between a write head and a read head moving relative to first and further signals borne by a carrier, comprising:

first time-delay means for delaying the first write signal with respect to the further signal supplied by the write head;

other first time-delay means for delaying the first read signal with respect to the further signal supplied by the read head;

further time-delay means for delaying the further signal from the write head to provide a plurality of time-delayed further signal each having a different associated time delay;

other further time-delay means for delaying the further signal from the read head to provide a plurality of other time-delayed further signals each having a different associated time delay;

correlation means for providing outputs corresponding to the best correlation between the time-delayed first write and read signals and the further signals supplied by the write and read heads and also the plurality of time delayed further signals from the further time delay means and the plurality of other time-delayed further signals from the other further time-delay means respectively;

means for subtracting the time-delay value of the best-correlated read head signal from the time-delay value of the best-correlated write head signal to provide a timing error value from which the azimuth error may be derived.

8. An apparatus according to claim 7 wherein the correlation means comprises a plurality of correlators and peak-position detectors.

9. An apparatus according to claim 7 wherein the means for subtracting comprises a subtractor.

10. An apparatus according to claim 8 wherein the means for substracting comprises a subtractor.

11. An apparatus according to claim 7 wherein the further time-delay means comprises cascaded time delays.

12. An apparatus according to claim 8 wherein the further time-delay means comprises cascaded time delays.

13. An apparatus according to claim 9 wherein the further time-delay means comprises cascaded time delays.

14. An apparatus according to claim 7 wherein the further time delay means comprise a parallel arrangement of time-delays.

15. An apparatus according to claim 8 wherein the further time delay means comprise a parallel arrangement of time-delays.

16. An apparatus according to claim 9 wherein the further time delay means comprise a parallel arrangement of time-delays.

17. An apparatus according to claim 7 further including a multiplier for multiplying the timing error value with a predetermined constant to provide the azimuth error.

* * * * *